July 2, 1963  R. B. COTTON  3,096,055
AERIAL CARGO DELIVERY SYSTEM
Filed Aug. 17, 1961  2 Sheets-Sheet 1

INVENTOR.
Robert B. Cotton
BY
Herbert M Birch
ATTORNEY

United States Patent Office 3,096,055
Patented July 2, 1963

3,096,055
AERIAL CARGO DELIVERY SYSTEM
Robert B. Cotton, Media, Pa., assignor to All American Engineering Company, Wilmington, Del., a corporation of Delaware
Filed Aug. 17, 1961, Ser. No. 132,088
27 Claims. (Cl. 244—137)

This invention relates to systems for dropping cargo from aircraft and more particularly for dropping cargo from low flying aircraft with pinpoint accuracy.

Present day systems for dropping either animate or inanimate cargo from an aircraft at a designated destination require that the aircraft be flying at an altitude sufficient for a parachute to properly function and lower the cargo to the ground.

Also, present day systems are adversely affected by local wind conditions and the like whereby dropped cargo may drift for several miles from the desired contact point before being deposited on the ground. Because of this problem a large amount of cargo is lost or damaged.

Another disadvantage of present day cargo delivery systems is that tremendous quantities of components utilized therein, such as cables and parachutes, must of necessity be expended at the cargo delivery point. Thus, the equipment cost of cargo delivery operations is very high.

A primary object of this invention is to provide an aerial cargo delivery system for dropping cargo from an aircraft to a ground position, whereby the drag load from a relatively small parachute being pulled through the air by the aircraft is used to extract the cargo from the aircraft and decelerate the cargo to zero ground velocity.

Another object of this invention is to provide a novel aerial cargo delivery system, whereby the same equipment may be used for a plurality of successive cargo drops.

Still another object of this invention is to provide a novel low level aerial cargo delivery system, wherein the cargo is decelerated from the velocity of the aircraft to zero ground velocity immediately prior to engagement with the ground.

Still another object of this invention is to provide an aerial cargo delivery system, wherein a single drag chute is used to both extract the cargo from an aircraft and deposit the cargo on the ground, the drag chute being automatically decoupled from the said cargo and returned to the said aircraft after each cargo drop for use with succeeding drops.

Still another object of this invention is to provide an aerial cargo delivery ssytem wherein a single drag chute is used to both extract the cargo from an aircraft and deposit the cargo on the ground and wherein said drag chute is first ejected from said aircraft a predetermined distance at the initiation of each cargo drop.

Still another object of this invention is to provide an aerial cargo delivery system wherein a single drag chute is used to both extract the cargo from an aircraft and deposit the cargo on the ground at a velocity, with respect to the said ground, wherein both the horizontal and vertical components of velocity are substantially equal to zero.

Still another object of this invention is to provide an aerial cargo delivery system whereby cargo may be dropped from an aircraft to a ground position and accurately and repeatedly be deposited in a predesignated limited area at the point of delivery regardless of ambient ground and meteorological conditions.

Still another object of this invention is to provide an aerial cargo delivery system whereby the area of the parachutes used therein may be reduced to at least twenty times smaller than that used in a normal parachute drop.

Still another object of this invention is to provide an aerial cargo delivery system whereby the kinetic energy of the aircraft is utilized to eject the cargo from the aircraft and subsequently decelerate the cargo to zero ground velocity.

Still another object of this invention is to provide an aerial cargo delivery system whereby the cargo is decelerated to zero ground velocity after being ejected from an aircraft and complete control is maintained over the said cargo during deceleration.

Still another object of this invention is to provide an aerial cargo delivery system whereby the amount and weight of equipment necessary to the dropping of cargo is reduced, thereby increasing the pay-load of the aircraft used.

Still another object of this invention is to provide an aerial cargo delivery system whereby complete control is maintained during a cargo drop over all of the equipment necessary to deliver a cargo to the ground from an aircraft.

Yet another object of this invention is to provide an aerial cargo delivery system whereby such a high degree of controlled reliability is attainable as to make the said system suitable for the delivery of personnel as well as cargo.

These and other objects of the invention will become apparent by reference to the following specification and drawings which relate to several preferred embodiments of the invention.

Figure 1:
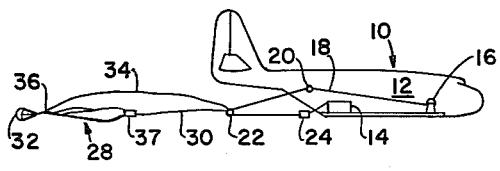
FIGURE 1 shows the first step in a cargo drop using the system of the invention.
Figure 2:
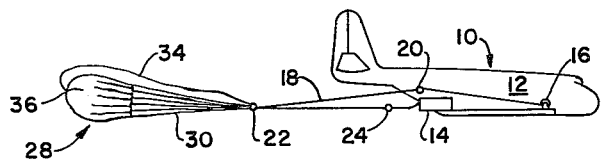
FIGURE 2 shows the next step in a cargo drop from that shown in FIGURE 1.
Figure 3:
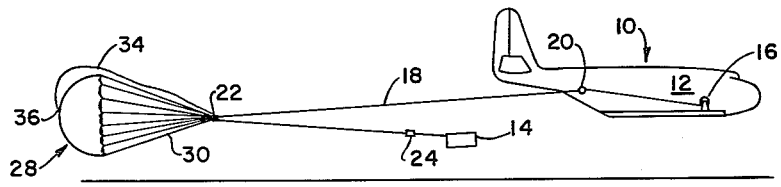
FIGURE 3 shows the next step in a cargo drop from that shown in FIGURE 2.
Figure 4:
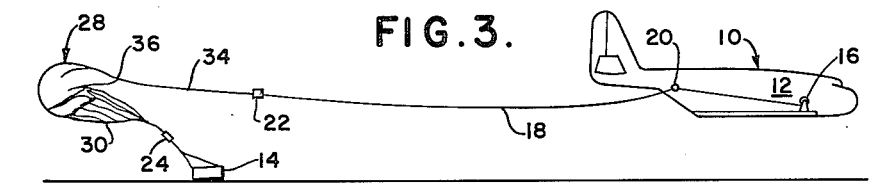
FIGURE 4 shows the next step in a cargo drop from that shown in FIGURE 3.
Figure 5:
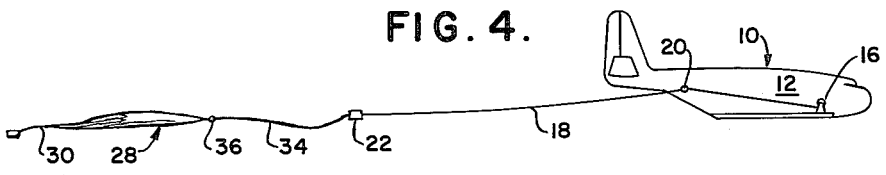
FIGURE 5 shows the final step in a cargo drop using the system of the invention.

Basically this invention comprises a system which utilizes the controlled drag of a parachute to extract a cargo from an aircraft and decelerate same from the velocity of the aircraft to a zero velocity with respect to the ground. The system is particularly well adapted for low altitude cargo drops such as those made under fifty (50) feet and is capable of depositing a cargo on the ground at a velocity equal to zero in both the vertical and horizontal components thereof.

The cargo is attached to one end of a cable which is reeved around a sheave or free pulley structure to which is attached a single parachute, hereinafter referred to as a drag chute, from whence the other end of the cable is returned to a fixed point within the aircraft where it is anchored. The fixed point may be adjusted as to the length of cable between it and the cargo by placing a winch at the fixed point by which cable may be stored, extended or retracted at will.

Referring in detail to the drawings and more particularly to FIGURES 1 through 6, an aircraft 10 having cargo hold 12 open at the rear of the aircraft 10 is shown as containing a cargo 14 and a winch 16.

A cable 18 extends from the winch 16 over a fixed pulley 20 mounted on the aircraft 10 and extends, as shown, from the fixed pulley 20 to a free pulley or sheave assembly 22. The cable 18 is reeved through the sheave assembly 22 and extends therefrom back towards the aircraft 10 to one side of a release means 24. The other side of the release means 24 is connected to a cargo harness 26 by which the cargo 14 is attached to the main cable 18.

Coupled to the sheave assembly 22, by a means to be hereinafter described, is a drag parachute 28 having shroud lines 30 and a pilot chute 32 thereon. An additional line, hereinafter referred to as a static line 34, extends from the sheave assembly 22 to the apex 36 of the parachute 28 for a purpose to be hereinafter described.

A reefing ring 37 may be provided to initially maintain the parachute 28 in a reefed condition.

Figure 7:
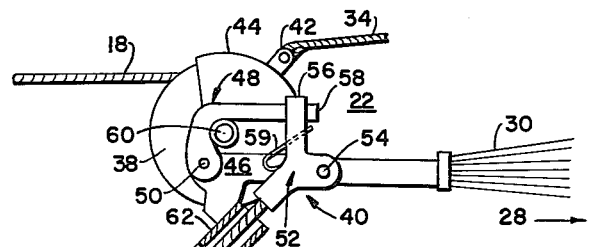
FIGURE 7 is a detail of one embodiment of the system of FIGURE 6.

Referring now to FIGURE 7, the sheave assembly 22 is shown as comprising a pulley 38, about which is reeved the main cargo cable 18, and a quick release coupling 40 for releasably connecting the shroud lines 30 of the parachute 28 to the sheave assembly 22. The static line 34 is directly connected to a fixed ring 42 or the like on the outer housing 44 of the pulley 38.

The parachute release coupling 40 on the sheave assembly 22 is shown as comprising a main body portion 46 having an L-shaped link 48 pivoted to one end thereof by a pivot 50 and a substantially Y-shaped link 52 pivoted to the other end thereof by a pivot 54 to which is also attached the shroud lines 30 of the parachute 28. One leg 56 of the Y-shaped link 52 is hooked over the free end 58 of the L-shaped link 48 and maintained in contact therewith by the action of a biasing spring 59 fixed to the main body portion 46 of the parachute release coupling 40.

The main body portion 46 of the parachute release coupling 40 is a cradle-like structure which releasably receives and supports the housing 44 of the pulley 38 in the sheave assembly 22. The system of interconnected levers comprising the parachute release coupling 40 releasably retain the pulley 38 and housing 44 by the engagement of the L-shaped link 48 with the axle 60 of the pulley 38.

The axle 60 is extended through both sides of the pulley housing 44 and the linkage comprising the parachute release coupling 40 is duplicated, as shown for one side of the sheave assembly 22, on both sides of the pulley housing 44 to engage both ends of the axle 60.

The main body or cradle 46 of the parachute release coupling 40 also includes a parachute release actuator guide tube 62 through which the main cargo cable 18 and an attached parachute release actuator 64 are adapted to pass.

As further shown in FIGURE 7 the parachute release actuator comprise a detent 66 integral with the main cable 18 and mounted on the shank 68 of a part of the cargo release means 24. The detent 66 may be frustro-conical in shape as shown or may be made in some other desired shape.

The cargo release means 24 comprises a hollow cup-shaped housing 70 concentrically enclosing an axially disposed coupling shank 72 fixed in the closed end thereof and coupled by a quick release connection 74 or the like to the free end of the coupling shank 68 integral with the detent 66 on the main cargo cable 18. The fixed shank 72 and housing 70 are made integral with the cargo harness 26.

The quick release connection 74 is effected by confining an interfitting geometric zig-zag or the like within a spring-positioned cylindrical sleeve 76. The sleeve 76 is biased by a compression spring 78 against a limit-stop snap ring 80 mounted in a recessed slot 82 in the open end of the hollow housing 70. The dimensions of the snap ring 80 are such that the end surface 84 of the parachute release actuator guide tube 62 may pass therethrough and into engagement with the cylindrical sleeve 76 in the quick release connection 74.

Figure 8:
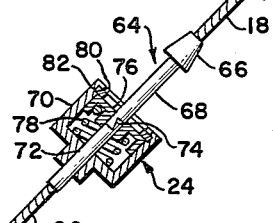
FIGURE 8 is a detail of another embodiment of the system of FIGURE 6.
Figure 8:
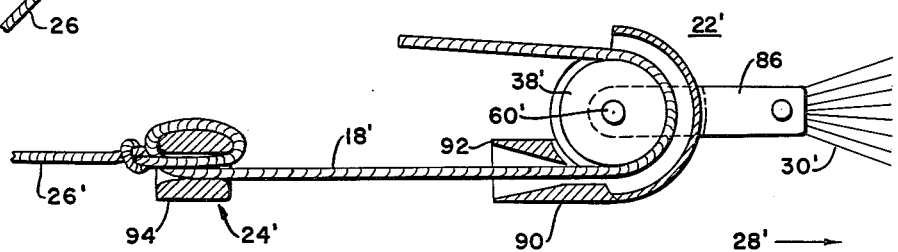

An alternative embodiment of the system is shown in FIGURE 8 wherein the sheave assembly and cargo release are labelled 22' and 24', respectively.

The sheave assembly 22' comprises a pulley 38' having an axle 60' to which the shroud lines 30' of the parachute 28' (not shown) are directly connected by way of a leader 86.

The outer housing 88 of the pulley 38' includes a guide tube 90 with a circumferential knife edge 92 integral with the end of the guide tube 90 and located adjacent the load release coupling 24' on the main cargo cable 18'.

The cargo release coupling 24' comprises a short length of hollow thick-walled cylinder 94 through which the main cable 18' is looped and then knotted or otherwise coupled to the cargo harness 26'.

*Operation*

Figure 6:
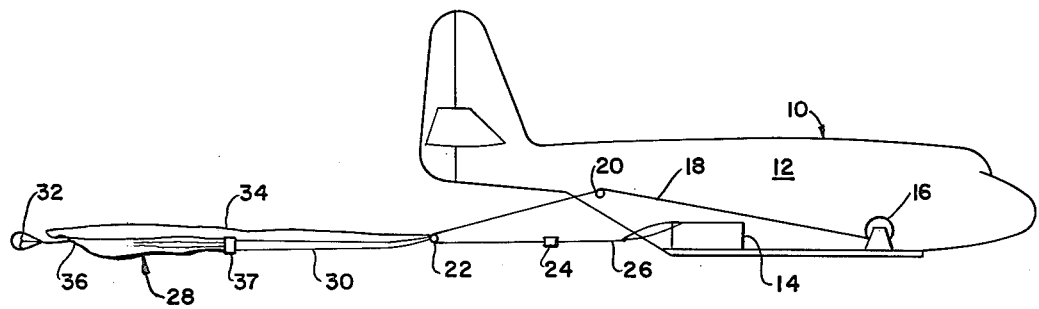
FIGURE 6 is an enlarged showing of FIGURE 1.

The operation of the low level cargo delivery system is as follows:

Referring first to FIGURES 1 and 6, the parachute or drag chute 28 is first placed in a reefed condition by the reefing ring 37. Assuming now that the cargo 14 has been releasably coupled to the main cable 18 by one of the release means 24 or 24' (FIGURES 7 and 8), the reefed parachute 28 and the sheave assembly 22 are payed-out of the aircraft to a predetermined distance therefrom based on the speed of the aircraft.

This distance is also a function of the drag of the parachute 28, and the mass of the particular cargo 14, whereby the drag of the parachute acting on the cargo 14 will be sufficient to accelerate the cargo 14 to a velocity which is exactly equal and opposite to that of the aircraft at the time the cargo 14 is released from the cable 18, thus decelerating the cargo 14 and delivering same onto the ground at zero velocity. Since the force of gravity is acting on the cargo 14 and since the cargo 14 will not be pulled from the plane by the parachute along a path exactly horizontal with the ground, the distance of pay-out may be regulated such that the angle of approach of the cargo 14 to the sheave assembly 22 during the deceleration process may effectively cancel the vertical component of cargo velocity and the cargo 14 may gently be placed on the ground with no apparent impact.

Once the parachute 28 has been payed-out to the proper distance the reefing ring 37 is broken, as by detonating or the like, and the parachute 28 opens and drags the cargo 14 from the hold 12 of the aircraft 10.

The cargo 14 and the cable 18 are accelerated on the cargo side of the sheave assembly 22 in a direction opposite that of the aircraft 10 until the cargo release coupling 24 engages the sheave assembly 22.

Referring first to the embodiment shown in FIGURE 7, the parachute release actuator 64 is accelerated with the cargo towards the sheave assembly 22 and finally passes through the actuator guide tube 62 of the parachute release 40 into engagement with the lower arm of the Y-shaped link 52. The impact of the frustro-conical portion 66 of the release actuator 64 on the Y-shaped link 52 creates a turning moment clockwise about the pivot 54 which opposes and overrides the counter-clockwise moment created by the spring means 59. This causes the hooked end 56 of the other arm of the Y-shaped link 52 to release the free end 58 of the L-shaped link 48 whereby the drag of the parachute 28 and the position of the pulley axle 60 causes the L-shaped link 48 to flip up and disengage itself from the axle 60 whereby the entire parachute release means 40 is separated from the sheave assembly 22. The remaining portion of the sheave assembly 22 is now retained on the cable 18 by virtue of the fact that the release detent 66 cannot pass through the sheave housing 44. At this point, the static line 34 between the sheave assembly 22 and the apex 36 of the parachute 28 becomes taught, spills the air from the chute and causes the parachute 28 and the parachute release assembly 40 to trail behind the aircraft 10. The winch 16 may subsequently be actuated to retrieve the trailing main cable 18, the parachute 28, the sheave assembly 22 and the parachute release assembly 40.

Concurrent with the parachute release operation, the cargo release 24 engages the leading edge 84 of the guide tube 62. The leading edge 84 passes through the retaining snap ring 80 into engagement with the spring-positioned sleeve member 76, whereby the zig-zag joint or coupling 74 is removed from the confines of the sleeve 76 when the impact of the leading edge 84 causes the spring 78 to compress and allow the sleeve 76 to move inwardly of the release housing 70.

Thus, the cargo 14 and cargo harness 26 are released from the main cable 18 concurrently with the release and spilling of the parachute 28 from the sheave assembly 22. At this point in the cargo drop the cargo has been decelerated from the speed of the aircraft to a zero ground velocity, whereby upon actuation of the cargo release 24 the cargo 14 is left sitting still with respect to the ground and depending on the altitude of the aircraft is either on the ground or at some selected altitude above it.

The embodiment of FIGURE 8 provides a means by which the sheave assembly 22' and the parachute 28' may be expended with each cargo drop. This embodiment would be useful for small aircraft not having a winch mounted thereon to recover the cable and where small quantities of emergency supplies or individual personnel are to be delivered.

The length of cable 18' is predetermined for a drop at a given aircraft speed whereby when the section of the cable 18' looped about the thick walled cylinder 94, comprising the cargo release 24', strikes the knife edge 92 on the guide tube 90 of the sheave assembly 22', the cable 18' is cut to release the cargo, the sheave assembly 22' and the parachute 28' at that point in the cargo drop where the ground velocity of the cargo is zero.

If no winch is present in the aircraft, the cable 18' may be jettisoned immediately subsequent to the cargo drop.

While the cargo drop system of the present invention has been described in operation as including a reefed parachute when the main cable 18 and the parachute 28 are initially payed-out of the aircraft 10, it is to be understood that the length of cable 18 for a particular cargo drop could be provided for internally of the cargo hold 12 and the parachute 28 and cable 18 could be forcibly ejected from the aircraft with the parachute 28 in an unreefed or open condition to initiate the cargo drop operation.

The present invention also provides for the use of the maximum drag characteristics of the parachute 28 since the sheave assembly 22 will not permit the parachute 28 to decelerate to a velocity below one-half (½) the speed of the aircraft 10.

As can be seen from the foregoing specification and drawings, this invention provides an aerial cargo delivery system which will deliver cargo anywhere without any preparation at the delivery point; will deliver at altitudes below fifty feet or at higher altitudes with pinpoint accuracy; will reduce the expense of delivery in repetitions or large operations since the equipment can be used over and over again; will not be affected by high winds and other ambient meteorological conditions at the delivery point; will utilize the maximum efficiency of the drag load on the parachute used therein since parachute speed never fall below one-half (½) aircraft speed; and will provide for complete control of cargo and equipment during the entire drop.

It is to be understood that the specific embodiments shown and described herein are for the purpose of example only and are not intended to limit the scope of the appended claims.

What is claimed is:

1. A cargo delivery system for delivering a cargo from a moving aircraft to a ground station comprising an aircraft, a cargo carried by said aircraft, a cable fixed at one end in said aircraft, said cable being connected at its other end to said cargo, a sheave, said cable being reeved on said sheave intermediate the ends thereof, a parachute mounted on said sheave and a releasable cargo coupling between said cargo and the other end of said cable having sheave engaging actuating means thereon, whereby the drag of said parachute on said sheave is transmitted to said cable to cause said cargo to be extracted from said aircraft and accelerated thereby in a direction opposite to that of said aircraft until such time as said sheave engaging actuating means on said releasable cargo coupling contacts said sheave and releases said cargo from said cable.

2. The invention defined in claim 1, wherein said sheave includes means cooperating with said sheave engaging actuating means to retain said sheave on said cable.

3. The invention defined in claim 1, wherein said parachute is fixedly connected at one end to said sheave by a static line connected from said sheave to the apex of said parachute and said parachute is releasably coupled at its other end to said sheave by a parachute release means connected to the shroud lines thereof, said parachute release means being actuated by said sheave engaging actuating means on said cargo coupling to uncouple said parachute from said sheave at said shroud lines and cause said chute to spill and trail said sheave on said static line.

4. The invention defined in claim 1, wherein said sheave engaging means cooperates with means on said sheave to simultaneously release said sheave, said cargo and said parachute from said cable.

5. The invention defined in claim 1 including adjustable means for said cable to provide a predetermined length between said releasable coupling and said sheave, said predetermined length being such that the said cargo is accelerated to a velocity equal and opposite to the velocity of the said aircraft, whereby said cargo at the time of release from said cable is travelling at zero velocity with respect to said ground station.

6. The invention defined in claim 5, wherein said adjustable means for said cable comprises a winch at the fixed end of said cable for paying out said cable prior to a cargo drop and retrieving said cable subsequent thereto.

7. The invention defined in claim 5, wherein said sheave includes means cooperating with said sheave engaging actuating means to retain said sheave on said cable.

8. The invention defined in claim 7, wherein said parachute is fixedly connected at one end to said sheave by a static line connected from said sheave to the apex of said parachute and said parachute is releasably coupled at its other end to said sheave by a parachute release means connected to the shroud lines thereof, said parachute release means being actuated by said sheave engaging actuating means on said cargo coupling to uncouple said parachute from said sheave at said shroud lines and cause said chute to spill and trail said sheave on said static line.

9. The invention defined in claim 5, wherein said sheave engaging means cooperates with means on said sheave to simultaneously release said sheave, said cargo and said parachute from said cable.

10. In an aerial cargo delivery system in an aircraft for delivering a cargo from a moving aircraft to a ground station, and including an aircraft and a cargo carried by said aircraft, means carried by said aircraft for decelerating said cargo from the velocity of said aircraft to a substantially zero velocity with respect to said ground station while said cargo is under the control of said system and release means coordinated with said means for releasing said cargo from said system when the velocity of said cargo with respect to said ground station is substantially equal to zero.

11. In an aerial cargo delivery system in an aircraft for delivering a cargo from a moving aircraft to a ground station, and including an aircraft and a cargo carried by said aircraft, means carried by said aircraft for accelerating said cargo in a direction opposite to the velocity of said moving aircraft for a time sufficient to decelerate said cargo from the velocity of the aircraft to a predetermined velocity with respect to said ground station while said cargo is under the control of said system and release means coordinated with said means for releasing said cargo from said system when the velocity of said cargo with respect to said ground station is substantially equal to said predetermined velocity.

12. The invention defined in claim 11, wherein said means for accelerating said cargo include means co-operating with said release means for retaining said means for accelerating said cargo with said system subsequent to the release of said cargo.

13. The invention defined in claim 11, wherein said release means includes means for simultaneously releasing said cargo and said means for accelerating said cargo from said system.

14. The invention defined in claim 11, wherein said means for accelerating said cargo comprises a cable fixed at one end in said aircraft and connected at its other end to said release means, a sheave, said cable being reeved on said sheave intermediate the ends thereof, and a parachute connected to said sheave.

15. The invention defined in claim 14, wherein said sheave includes means cooperating with said release means for retaining said sheave and said parachute on said cable.

16. The invention defined in claim 14, wherein said release means includes means cooperating with means on said sheave for simultaneously releasing said cargo, said sheave, and said parachute from said cable.

17. The invention defined in claim 14, wherein said sheave comprises a pulley for reeving said cable, a housing for said pulley, a static line extending from said housing to the apex of said parachute for fixedly retaining said parachute on said sheave, and means connected with he shroud lines of said parachute for releasably coupling said parachute to said housing and coordinated with said release means to disconnect said parachute from said sheave at the shroud line coupling thereof causing said chute to spill and trail behind said sheave on said static line.

18. In a cargo delivery system in an aircraft for delivering a cargo from a moving aircraft to a ground station, and including an aircraft and a cargo carried by said aircraft, means for accelerating said cargo in a direction opposite to the velocity of said moving aircraft to selectively vary the velocity of said cargo with respect to said ground station comprising a cable fixed at one end in said aircraft and connected at its free end to said cargo, a sheave, said cable being reeved on said sheave intermediate the ends thereof, and a parachute connected to the sheave, whereby the drag on said parachute will cause said parachute and said sheave to move along said cable in a direction opposite to the velocity of said aircraft and cause said cargo and the free end of said cable to accelerate in the same direction.

19. A cargo drag parachute comprising a sheave, a canopy and shroud lines both connected to said sheave, a release assembly interconnecting said sheave and said shroud lines, a cargo drag cable reeved around said sheave, and means associated with said sheave and said drag cable for actuating said release assembly to separate the said shroud lines from said sheave.

20. In an aerial cargo delivery system including a moving airborne body, a cargo carried by said airborne body, and a receiving station for delivering said cargo from said moving airborne body to said receiving station wherein there is a difference in velocity between said airborne body and said station, means carried by said airborne body for accelerating said cargo from said airborne body in such a direction as to overcome said difference in velocity, and release means coordinated with the first of said means for releasing said cargo from said system when the difference in velocity between said cargo and said airborne body is substantially equal to the said difference between said receiving station and said airborne body.

21. The invention defined in claim 20, wherein said means for accelerating said cargo includes means cooperating with said release means for retaining said means for accelerating said cargo with said system subsequent to the release of said cargo.

22. The invention defined in claim 20, wherein said release means includes means for simultaneously releasing said cargo and said means for accelerating said cargo from said system.

23. The invention defined in claim 20, wherein said means for accelerating said cargo comprises a cable fixed at one end in said aircraft and connected at its other end to said release means, a sheave, said cable being reeved on said sheave intermediate the ends thereof, and a parachute conneced to said sheave.

24. The invention defined in claim 23, wherein said sheave includes means cooperating with said release means for retaining said sheave and said parachute on said cable.

25. The invention defined in claim 23, wherein said release means include means cooperating with means on said sheave for simultaneously releasing said cargo, said sheave, and said parachute from said cable.

26. The invention defined in claim 23, wherein said sheave comprises a pulley for reeving said cable, a housing for said pulley, a static line extending from said housing to the apex of said parachute for fixedly retaining said parachute on said sheave, and means connected with the shroud lines of said parachute for releasably coupling said parachute to said housing and coordinated with said release means to disconnect said parachute from said sheave at the shroud line coupling thereof causing said chute to spill and trail behind said sheave on said static line.

27. In an aerial delivery system including a first moving body, a second body carried by said first body and a third body moving at a velocity different from said first body, means for accelerating said second body away from said first body until the relative velocity between said second and third bodies reaches a predetermined value comprising a drag body, a sheave fastened to said drag body, a cable fixed at one end to said first body and secured at its other end to said second body, said cable being reeved on said sheave intermediate the said ends thereof and release means coordinated with said sheave for releasing said second body from said cable when the velocity of said second body relative to said third body reaches said predetermined value.

References Cited in the file of this patent
UNITED STATES PATENTS

| | | |
|---|---|---|
| 800,926 | Mahony | Oct. 3, 1905 |
| 2,477,907 | Smith | Aug. 2, 1949 |
| 3,017,163 | Van Zelm et al. | Jan. 16, 1962 |